(12) United States Patent
Sato

(10) Patent No.: US 8,037,758 B2
(45) Date of Patent: *Oct. 18, 2011

(54) ANGULAR VELOCITY DETECTION APPARATUS

(75) Inventor: Kenji Sato, Matsumoto (JP)

(73) Assignee: Seiko Epson Corporation (JP)

( * ) Notice: Subject to any disclaimer, the term of this patent is extended or adjusted under 35 U.S.C. 154(b) by 648 days.

This patent is subject to a terminal disclaimer.

(21) Appl. No.: 12/141,985

(22) Filed: Jun. 19, 2008

(65) Prior Publication Data

US 2008/0314145 A1 Dec. 25, 2008

(30) Foreign Application Priority Data

Jun. 20, 2007 (JP) ................................. 2007-162527

(51) Int. Cl.
G01C 19/00 (2006.01)
G01P 21/00 (2006.01)
G01P 3/04 (2006.01)

(52) U.S. Cl. ......... 73/504.12; 73/510; 73/1.37; 702/104

(58) Field of Classification Search ............... 73/504.12, 73/504.16, 504.04, 504.02, 504.14; 310/370
See application file for complete search history.

(56) References Cited

U.S. PATENT DOCUMENTS

| | | | | |
|---|---|---|---|---|
| 6,508,123 | B2 * | 1/2003 | Hasegawa et al. | 73/504.12 |
| 6,584,841 | B1 * | 7/2003 | Ichinose et al. | 73/504.12 |
| 7,292,021 | B2 | 11/2007 | Tsuruhara et al. | |
| 7,779,687 | B2 * | 8/2010 | Murashima | 73/504.12 |
| 7,814,793 | B2 * | 10/2010 | Sato | 73/504.12 |

FOREIGN PATENT DOCUMENTS

| | | |
|---|---|---|
| JP | 2002-213959 | 7/2002 |
| JP | 2006-126178 | 5/2006 |
| JP | 2006-151280 | 6/2006 |
| JP | 2006-184074 | 7/2006 |

* cited by examiner

Primary Examiner — Helen C. Kwok
(74) Attorney, Agent, or Firm — Harness, Dickey & Pierce, P.L.C.

(57) ABSTRACT

An angular velocity detection apparatus includes: a sensor unit having first and second detection axes serving as angular velocity detection axes, the first and second detection axes intersecting each other; a sensor output correction circuit for making at least one of an offset adjustment and a sensitivity adjustment to a detection output of an angular velocity around the first detection axis and a detection output of an angular velocity around the second detection axis; a sign determination circuit for obtaining a sign of a rotational direction of an angular velocity on any one of the first and second detection axes; and an amplitude calculation circuit for multiplying a square sum average of detection outputs of angular velocities around the first and second detection axes outputted by the sensor output correction circuit and a sign outputted by the sign determination circuit.

7 Claims, 7 Drawing Sheets

ANGULAR VELOCITY DETECTION APPARATUS

BACKGROUND

1. Technical Field

The present invention relates to an angular velocity detection apparatus.

2. Related Art

To detect the behavior of a mobile unit, which is moving, with high accuracy so that the detected behavior is used by a navigation system, a safety device, a mobile data collector, or the like, the yaw angle and bank (roll) angle of the mobile unit must be obtained. While a gyro sensor is typically used to obtain the yaw angle, an accurate yaw angle may not be obtained depending on the type of the mobile unit. For example, if the mobile unit is a motorcycle, a gyro sensor is fixed to the body of the motorcycle. Thus, when the motorcycle is banked, the angular velocity detection axis is tilted, thereby failing to accurately obtain the yaw angle of the motorcycle.

In the case of a motorcycle or the like, the roll angle significantly varies when the motorcycle or the like is moving, as described above, and the yaw angle is influenced by the roll angle to a nonnegligible extent. Thus, the yaw angle must be detected with high accuracy. For this reason, a navigation system disclosed in JP-A-2006-126178 (hereafter referred to as a "first related-art example") is allowed to measure a turn angular velocity even when the roll angle varies, by using two tuning-fork-shaped gyro sensors. Specifically, in the navigation system, the gyro sensors are provided in a lateral direction with respect to a vertical direction when a mobile unit stands erect in a manner that the detection axes of the gyro sensors are symmetrically tilted in mutually reverse directions by an identical angle. When the mobile unit is tilted, the navigation system obtains a signal variation from each gyro sensor and calculates the signal variation to obtain a roll angle. Also, the navigation system obtains a turn angular velocity using the obtained roll angle.

However, with regard to the first related-art example, if the gyro sensors are mounted on a mobile unit in a manner that the gyro sensors are tilted, the gyro sensors are used in a manner that the detection axes of the gyro sensors are tilted from a vertical direction of the mobile unit. This impairs the detection sensitivity of the gyro sensors with respect to a variation in angular velocity. Specifically, as seen in FIG. 9 that shows the relation between the sensitivity and tilt angle of one gyro sensor, the sensitivity of the gyro sensor is reduced as the tilt angle of the detection axis of the sensor is increased. In particular, if the gyro sensor is a tuning-fork-shaped one, the sensor has only one drive arm and one detection arm. Therefore, the detection sensitivity of the sensor is originally low. For this reason, with regard to the first related-art example, it is difficult to set a large angle for the tilt angle between the two gyro sensors in terms of the detection sensitivity.

On the other hand, in order to obtain a highly sensitive tuning-fork-shaped gyro sensor, there is provided a method for extending a drive arm and a detection arm (vibration arm) of a gyro sensor. However, if this method is used, the size of the gyro sensor is increased. Also, in the first related-art example, the angular velocity detection axis of each tuning-fork gyro sensor extends in a direction in which a vibration arm thereof extends; therefore, the height (size) of the navigation system itself is unavoidably increased. Also, a highly-sensitive tuning-fork-shaped gyro sensor is obtained by increasing the gain (increasing the amplification factor of a signal); however, in this case, the noise signal is also amplified. Thus, the signal-to-noise (S/N) ratio deteriorates, resulting in a reduction in detection accuracy.

Also, the first related-art example requires that the gyro sensors have the same sensitivity or be disposed symmetrically when a mobile unit stands erect. Therefore, a difference in sensitivity between the gyro sensors causes an error in turn angular velocity, resulting in a reduction in accuracy of the navigation system. While it is relatively easy to dispose the gyro sensors in an erect manner or horizontally in terms of the structural design of the gyro sensors, some contrivance must be made to a base or the like on which the gyro sensors are to be mounted if the gyro sensors must be disposed symmetrically at a given angle. This results in an increase in manufacturing cost.

SUMMARY

An advantage of the invention is to provide an angular velocity detection apparatus for detecting an angular velocity with high accuracy.

According to an aspect of the invention, an angular velocity detection apparatus includes: a sensor unit having first and second detection axes serving as angular velocity detection axes, the first and second detection axes intersecting each other; a sensor output correction circuit for making at least one of an offset adjustment and a sensitivity adjustment to a detection output of an angular velocity around the first detection axis and a detection output of an angular velocity around the second detection axis; a sign determination circuit for obtaining a sign of a rotational direction of an angular velocity on any one of the first and second detection axes; and an amplitude calculation circuit for multiplying a square sum average of detection outputs of angular velocities around the first and second detection axes outputted by the sensor output correction circuit and a sign outputted by the sign determination circuit. Since an offset adjustment and a sensitivity adjustment are made to an output signal of the sensor unit by the sensor output correction circuit, the first and second angular velocity sensors need not be sensors having an identical level of sensitivity. Also, since an output of the sensor unit is calculated, the respective angles formed by a gravitational acceleration direction and the first and second detection axes need not be the same. Thus, the angular velocity detection apparatus reduces an error to detect an angular velocity with high accuracy.

In the angular velocity detection apparatus according to the aspect of the invention, the sensor unit preferably includes a first angular velocity sensor for detecting an angular velocity around the first detection axis and a second angular velocity sensor for detecting an angular velocity around the second detection axis. The first and second angular velocity sensors are preferably disposed so that an angle $\theta 1$ formed by a gravitational acceleration direction and the first detection axis and an angle $\theta 2$ formed by a gravitational acceleration direction and the second detection axis have a relation of $\theta 1 = -\theta 2$. Thus, if the angular velocity sensors are tilted, the first and second detection axes intersect each other. As a result, the detection range of an angular velocity is increased with respect to the gravitational acceleration direction.

In the angular velocity detection apparatus according to the aspect of the invention, the angular velocity sensors are preferably double-T-shaped gyro sensors. The double-T-shaped gyro sensors preferably each includes a base, detection arms extending from positions opposed to each other on the base, and drive arms disposed in parallel to the detection arms. Since each double-T-shaped gyro sensor is provided with four drive arms and two detection arms, it has a higher level of detection sensitivity. Thus, even when the angles θ1 and θ2 formed by the first and second detection axes and gravitational acceleration direction are increased, the ability to detect an angular velocity applied to the sensor unit is maintained. Also, since the detection sensitivity is improved, there is no longer the need to increase the gain. This prevents upsizing of the angular velocity detection apparatus itself.

In the angular velocity detection apparatus according to the aspect of the invention, an angle formed by the first and detection axes is preferably 90°±2°. Thus, even when the tilt (roll angle) of the sensor unit is increased, the ability to detect an angular velocity (yaw angle) applied to the sensor unit is maintained. Also, since the calculations for obtaining the roll angle and yaw angle are simplified, the calculation speed is increased.

The angular velocity detection apparatus according to the aspect of the invention preferably further includes a control circuit coupled to a back of the amplitude calculation circuit. The control circuit preferably receives and compares a multiplication result from the amplitude calculation circuit and output results from a plurality of physical quantity sensors, and if the multiplication result and the output results are not matched, the control circuit preferably outputs an offset adjustment factor or a sensitivity adjustment factor for matching the multiplication result and the output results, to the sensor output correction circuit. Thus, even if there is a difference between the output of the amplitude calculation circuit and the outputs of the physical quantity sensors, the sensor output correction circuit receives adjustment factors for adjusting this difference and replaces stored adjustment factors with the received adjustment factors. As a result, the difference is suppressed.

The angular velocity detection apparatus according to the aspect of the invention preferably further includes a bank angle calculation circuit for receiving a detection output ω1' of an angular velocity around the first detection axis and a detection output ω2' of an angular velocity around the second detection axis outputted by the sensor output correction circuit and obtaining a bank angle θ by performing a calculation of $$\theta = \tan^{-1}\left(\frac{\omega 2'}{\omega 1'}\right).$$ Formula 1

Thus, even when the sensor unit is banked, the angular velocity detection apparatus obtains the bank angle θ, since the axis of an angular velocity to be received is fixed. As a result, the angular velocity detection apparatus including a bank angle detection apparatus is obtained.

The angular velocity detection apparatus according to the aspect of the invention preferably further includes a sensor failure check circuit for receiving a detection output of an angular velocity around the first detection axis and a detection output of an angular velocity around the second detection axis outputted by the sensor output correction circuit, comparing a predetermined threshold and each of the detection outputs or comparing an output of an bank angle calculated by the bank angle calculation circuit and a predetermined threshold, and determining that there is a failure. Thus, if a failure occurs in the sensor unit, the failure is detected.

In the angular velocity detection apparatus according to the aspect of the invention, the sensor unit is preferably disposed in a mobile unit and the first and second detection axes are preferably disposed so as to be orthogonal to a straight-ahead direction of the mobile unit. Thus, the angular velocity detection apparatus obtains the yaw angle of the mobile unit with high accuracy. Even when the mobile unit has a large roll angle, the yaw angle is obtained. Also, since the angular velocity detection apparatus obtains the roll angle of the mobile unit, it grasps the moving state of the mobile unit.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
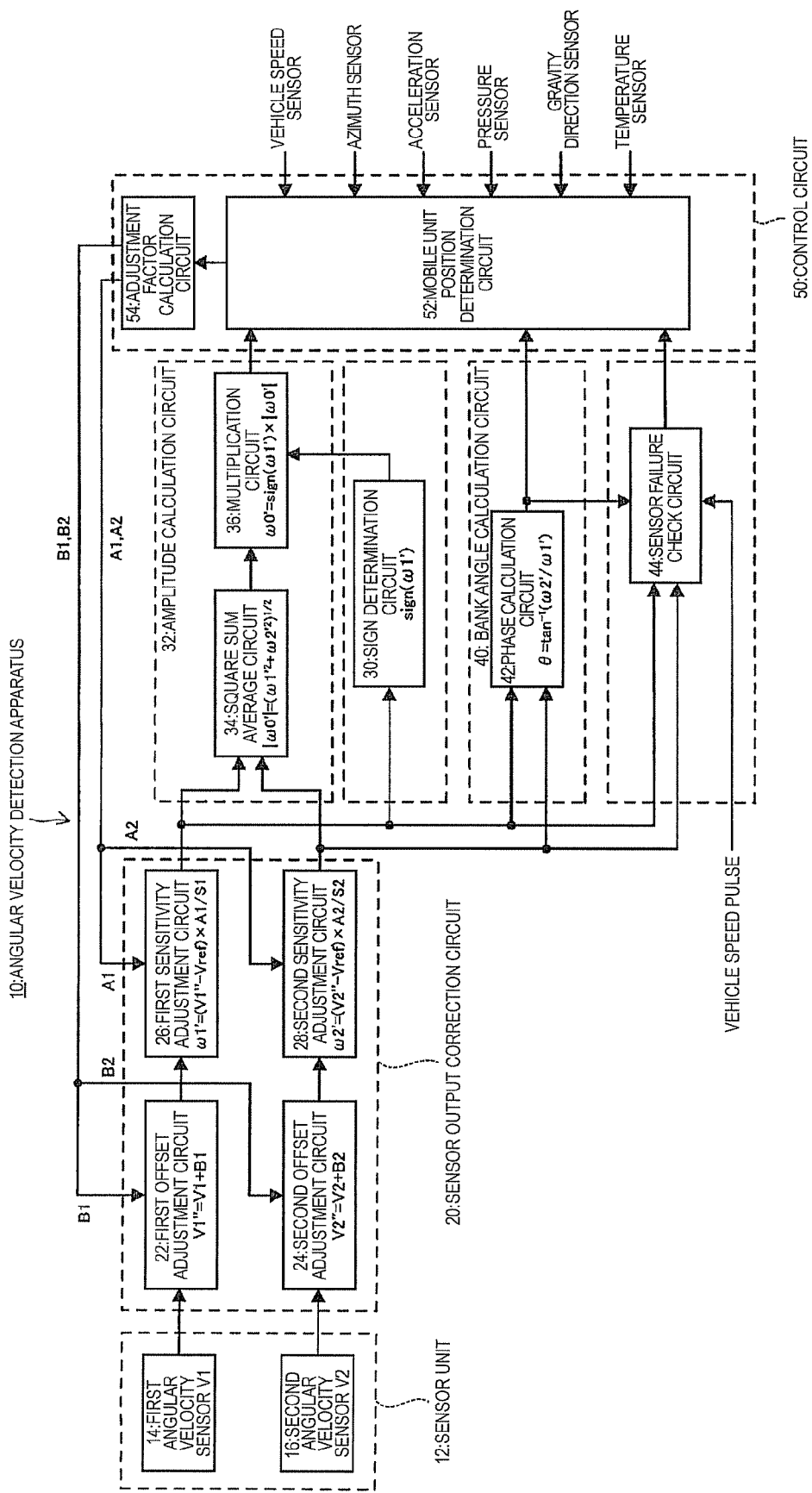
FIG. 1 is a block diagram of an angular velocity detection apparatus.

An angular velocity detection apparatus according to an embodiment of the invention will now be described. FIG. 1 is a block diagram of the angular velocity detection apparatus according to this embodiment. An angular velocity detection apparatus 10 includes a sensor unit 12, a sensor output correction circuit 20, a sign determination circuit 30, an amplitude calculation circuit 32, a bank angular velocity calculation circuit 40, a sensor failure check circuit 44, and a control circuit 50. The outline configuration of these circuits and like is as follows. That is, the sensor unit 12 includes first and second detection axes serving as angular velocity detection axes, which intersect each other. The sensor output correction circuit 20 makes an offset adjustment and a sensitivity adjustment to a detection output of an angular velocity around the first detection axis and a detection output of an angular velocity around the second detection axis outputted by the sensor unit 12.

The sign determination circuit 30 obtains the sign of a rotation direction of any one of the detection output of the angular velocity around the first detection axis and the detection output of the angular velocity around the second detection axis outputted by the sensor output correction unit 20. The amplitude calculation circuit 32 calculates the square sum average of the detection output of the angular velocity around the first detection axis and the detection output of the angular velocity around the second detection axis outputted by the sensor output correction unit 20, and then multiplies the calculated square sum average and the sign outputted by the sign determination circuit 30. The bank velocity calculation circuit 40 receives the detection output of the angular velocity around the first detection axis and the detection output of the angular velocity around the second detection axis outputted by the sensor output correction unit 20 and then performs a calculation so as to obtain a bank angle. The sensor failure check circuit 44 checks whether there is a failure in the sensor unit 12.

The control circuit 50 is coupled to the backs of the amplitude calculation circuit 32, bank angular calculation circuit 40, and sensor failure check circuit 44. The control circuit 50 receives the calculation results and the like from the amplitude calculation circuit 32, bank angular calculation circuit 40, and sensor failure check circuit 44 as well as measurement results outputted by physical quantity sensors other than the sensor unit 12 and compares the output result from the amplitude calculation circuit 32 and the measurement results from the physical quantity sensors. If the output result from the amplitude calculation circuit 32 deviates from the measurement results from the physical quantity sensors, the control circuit 50 modifies an offset adjustment factor or a sensitivity adjustment factor so as to eliminate this deviation and then outputs the modified adjustment factor to the sensor output correction circuit 20.

Next, the angular velocity detection apparatus 10 will be described in detail. The sensor unit 12 includes a first angular velocity sensor 14 for detecting an angular velocity around the first detection axis and a second angular velocity sensor 16 for detecting an angular velocity around the second detection axis. The first and second angular velocity sensors 14 and 16 may be any type of angular velocity sensors as long as to the first and second angular velocity sensors 14 and 16 are able to detect angular velocities around the detection axes. For example, these angular velocity sensors may be double-T-shaped gyro sensors. A double-T-shaped gyro sensor as one example of these angular velocity sensors has the following configuration.

Figure 2:
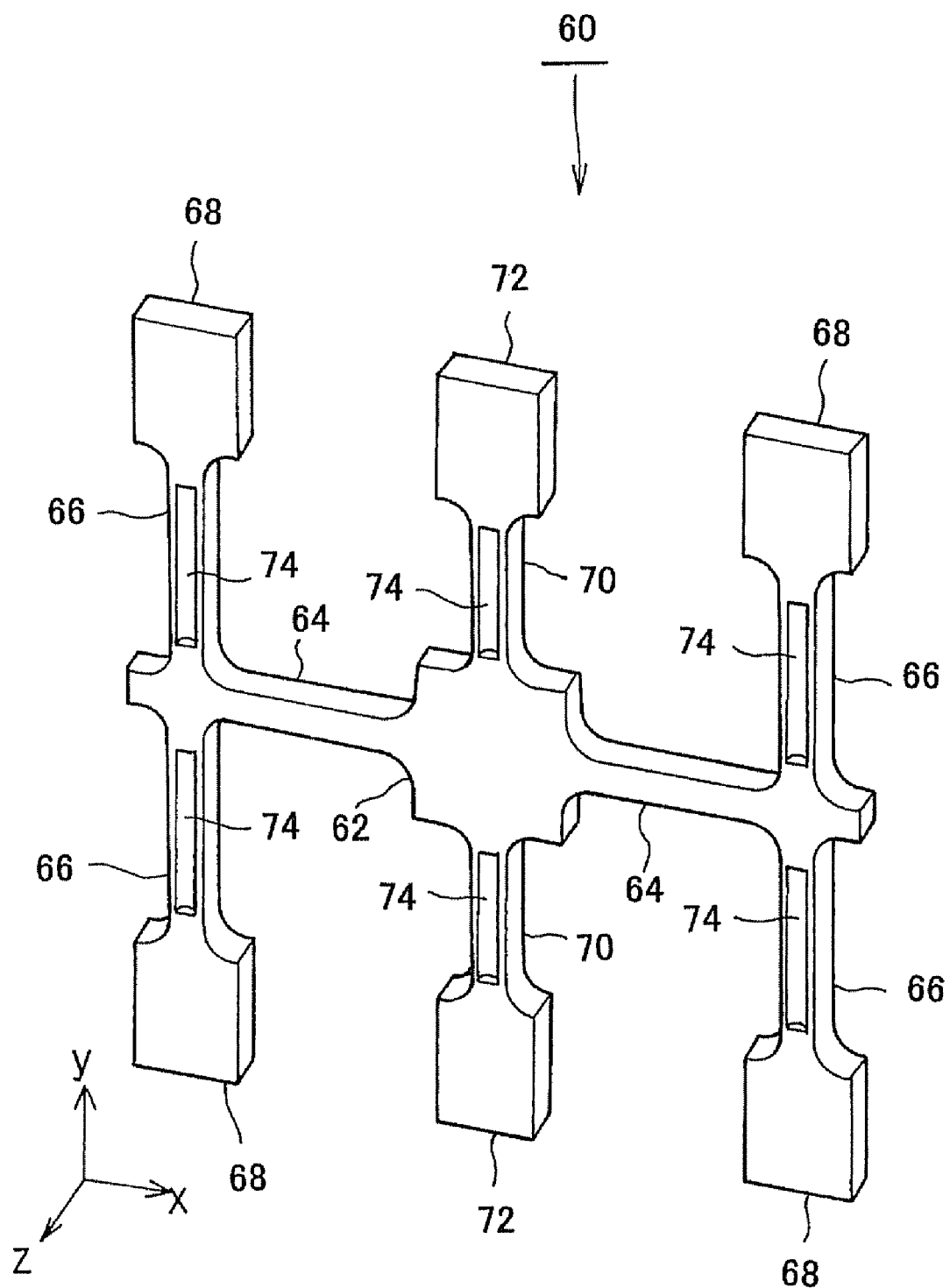
FIG. 2 is a schematic perspective view of a double-T-shaped gyro sensor.

FIG. 2 is a schematic perspective view of a double-T-shaped gyro sensor. A double-T-shaped gyro sensor 60 is made of a quartz crystal, specifically, it is formed of a z-cut quartz substrate cut out from a quartz crystal along an xy plane formed by an x axis (electric axis) and a y axis (mechanical axis) of the quartz crystal. The principal plane of the quartz substrate is the principal plane of the double-T-shaped gyro sensor 60. A z axis (optical axis) of the quartz crystal extends in a vertical direction of the xy plane.

The double-T-shaped gyro sensor 60 has a rectangular base 62 in the xy plane. The base 62 is provided with connection arms 64 extending in a direction parallel to the x axis from the center of each edge parallel to the y axis in the xy plane. Drive arms 66 extend from around the ends of the connection arm 64 in a direction parallel to the y axis in the xy plane. Rectangular weights 68 are provided at the ends of the drive arms 66 integrally with the drive arms 66 in a manner that each weight 68 has a larger width in the x axis direction than that of each drive arm 66. The base 62 is also provided with detection arms 70 extending in a direction parallel to the y axis from the center of each edge parallel to the x axis in the xy plane. Thus, the detection arms 70 and drive arms 66 are in parallel to each other. Rectangular weights 72 are provided at the ends of the detection arms 70 integrally with the detection arms 70 in a manner that each weight 72 has a larger width in the x axis direction than that of each detection arm 70.

A groove 74 is provided in the principal plane of each of the drive arms 66 and detection arms 70 along the length directions of these arms, and a metal film for use in a drive electrode or a detection electrode is provided on the entire inner surface of each groove 74. Thus, electric fields are efficiently generated between drive electrodes (not shown) or detection electrodes (not shown) formed on surfaces of the drive arms 66 and detections arm 70 in parallel to a zy plane, and electrodes (not shown) provided in the grooves 74. This allows downsizing of the double-T-shaped gyro sensor 60. That is, the double-T-shaped gyro sensor 60 represents micro-electromechanical systems (MEMS) of a quartz device. The drive arms 66 are provided with the drive electrodes and the detection arm 70 are provided with the detection electrodes. The drive electrodes and detection electrodes are coupled to vibration one-sided mount electrodes (not shown) provided on the back of the base 62 in a one-to-one manner. When the double-T-shaped gyro sensor 60 is housed in a package, the vibration one-sided mount electrodes serve as connections (connections to leads of an intermediate substrate to be described later) to electrodes on the package. The double-T-shaped gyro sensor 60 as described above has a low-height structure since the angular velocity detection axes extend in a direction (direction along the z axis) orthogonal to the principal plane of the sensor 60. Also, the double-T-shaped gyro sensor 60 has a higher level of sensitivity since it is provided with four drive arms 66 and two detection arms 70.

In the double-T-shaped gyro sensor 60, when electric signals (drive signals) are provided to the drive electrodes from an oscillation circuit via the vibration one-sided mount electrodes, the drive arms 66 make bending vibrations (drive vibrations) symmetrically. Specifically, the drive arm 66 shown in a left part of FIG. 2 and the drive arm 66 shown in a right part of FIG. 2 make vibrations symmetrically relative to a line that is passing through the barycenter of the double-T-shaped gyro sensor 60 and is in parallel to the y axis. If an angular velocity around the z axis is applied when the double-T-shaped gyro sensor 60 are making such drive vibrations, the Coriolis force in the y direction is exerted on the drive arms 66. Then, the detection arms 70 influenced by the Coriolis force makes bending vibrations (detection vibrations). Thus, output signals V are outputted from the vibration one-sided mount electrodes via the detection electrodes.

Figure 3:
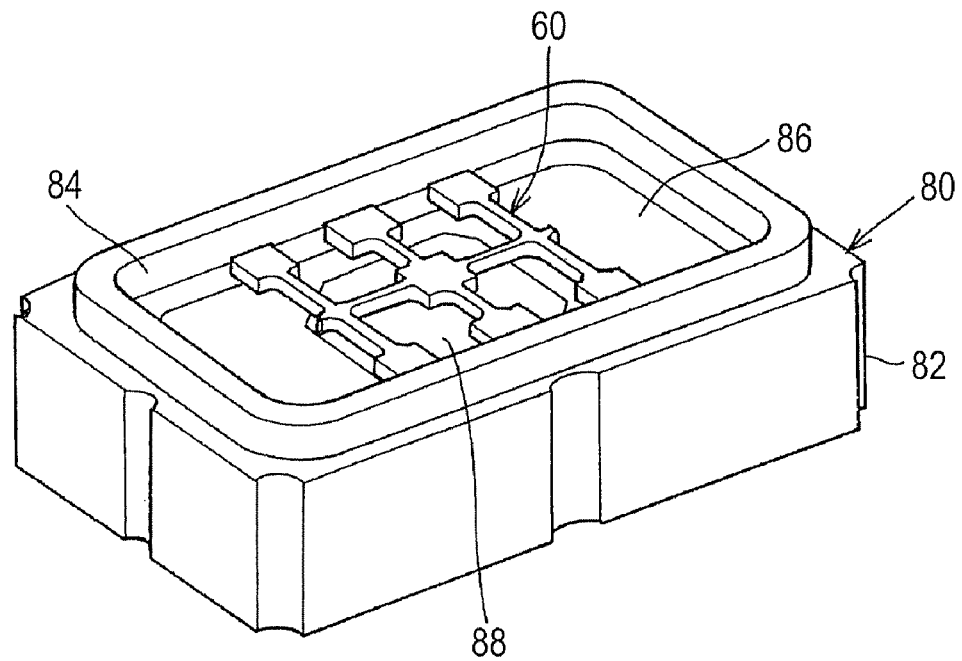
FIG. 3 is a perspective view of the double-T-shaped gyro sensor housed in a package.

The double-T-shaped gyro sensor 60 as described above is housed in a package. FIG. 3 is a perspective view of the double-T-shaped gyro sensor housed in a package. Note that a lid and leads are not shown in FIG. 3. When the double-T-shaped gyro sensor 60 is housed in a package 80, the gyro sensor is preferably disposed above an intermediate substrate 86. The intermediate substrate 86 is provided with a device hole 88 in the center thereof. Multiple leads (lead electrodes) are provided on the undersurface of the intermediate substrate 86 or in an intermediate layer thereof. The ends of these leads protrude into the device hole 88. These protruding ends are bent upward, and the base 62 of the double-T-shaped gyro sensor 60 is bonded to these ends. The ends of the leads and the vibration one-sided mount electrodes provided on the double-T-shaped gyro sensor 60 are coupled to each other in a one-to-one manner.

The package 80 shown in FIG. 3 includes a package base 82 having a recess 84 that is opened upward and a lid that is bonded to the upper surface of the package base 82 and seals the recess 84. The recess 84 contains an integrated circuit (IC) chip (not shown), including the oscillator circuit and the like, and an intermediate substrate 86 to which the double-T-shaped gyro sensor 60 is bonded. In other words, the IC chip is preferably mounted on the bottom of the recess 84. The intermediate substrate 86 is preferably disposed in the recess 84 in a manner that the substrate 86 directs the double-T-shaped gyro sensor 60 upward and is located above the IC chip. Thus, continuity is established between the double-T-shaped gyro sensor 60 and the IC chip as well as between an external terminal (not shown) provided on the back of the package base 82 and the IC chip. The lid is bonded to the top surface of the package base 82 so as to vacuum-seal the double-T-shaped gyro sensor 60 and the like.

Figure 4:
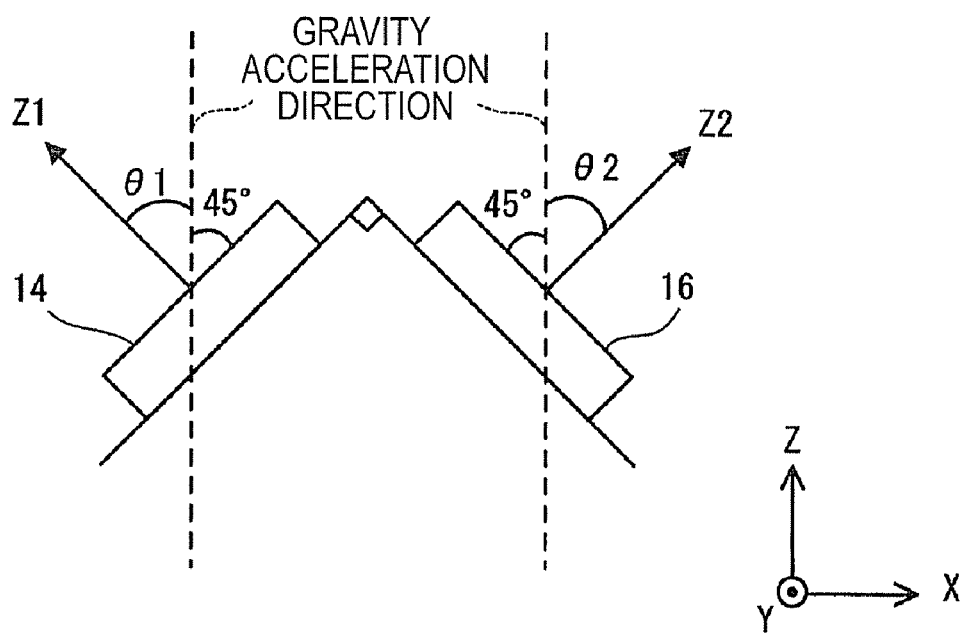
FIG. 4 is a diagram showing first and second angular velocity sensors disposed in a tilted manner.

In the sensor unit 12, the first and second angular velocity sensors 14 and 16 are disposed so that the first detection axis of the first angular velocity sensor 14 and the second detection axis of the second angular velocity sensor 16 intersect each other. FIG. 4 is a diagram showing the first and second angular velocity sensors disposed in a tilted manner. In the sensor unit 12, the first and second angular velocity sensors 14 and 16 are disposed in a tilted manner so that a detection axis Z1 of the first angular velocity sensor 14 is tilted by an angle θ1 that the detection axis Z1 forms with the gravitational acceleration direction indicated by a dotted line in FIG. 4 and a detection axis Z2 of the second angular velocity sensor 16 is tilted by an angle θ2 that the detection axis Z2 forms with the gravitational acceleration direction. Here, the θ1 and θ2 are set so as to satisfy θ1=−θ2. If the sensor unit 12 is disposed in a mobile unit, the angular velocity sensors 14 and 16 are disposed so that the first and second detection axes are provided in a direction orthogonal to a straight-ahead direction (+Y direction in FIG. 4) of the mobile unit, that is, provided in an xz plane formed by the x axis and z axis orthogonal to the y axis. In the sensor unit 12, for example, the above-described gravitational acceleration direction and an axis for detecting the yaw direction of the mobile unit may be aligned as long as the angular velocity sensors 14 and 16 are disposed so that an axis (axis for detecting the yaw angle of the mobile unit) in a direction orthogonal to the mobile unit is provided between the first and second detection axes.

If the double-T-shaped gyro sensors 60 are used as the angular velocity sensors 14 and 16, the angular velocity sensors 14 and 16 obtain a higher level of sensitivity despite their low-height structure, as described above. Therefore, the angular velocity sensors 14 and 16 maintain the angular velocity detection ability even if the tilt angles of the detection axes are set to a larger angle than that of a tuning-fork-shaped gyro sensor. As a result, the angles θ1 and θ2 formed by the first and second detection axes and the gravitational acceleration direction are selected in a wide range more than 0° and less than 90° as appropriate. This allows selection of a formed angle more suitable for detecting a roll angle. Incidentally, if the formed angles θ1 and θ2 are less than 45°, the angular velocity detection ability is considerably reduced as the roll angle is increased. Therefore, the formed angles θ1 and θ2 are preferably set to 45°.

Figure 5:
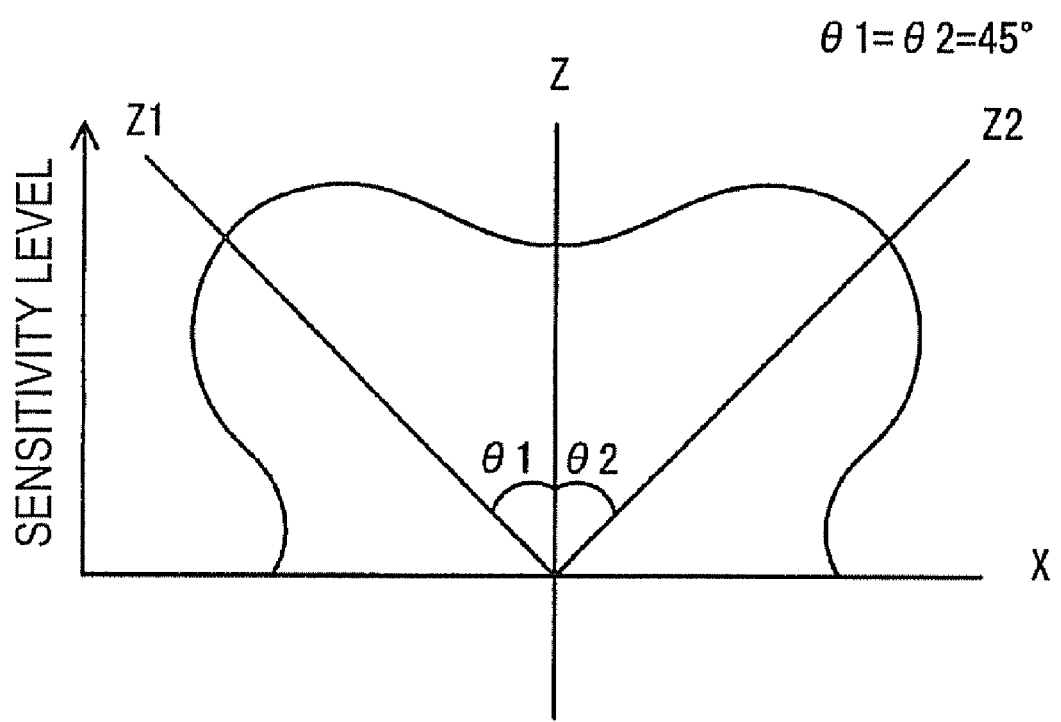
FIG. 5 is a graph showing the level of angular velocity detection sensitivity in a case where formed angles θ1 and θ2 are 45°.

FIG. 5 is a graph showing the level of angular velocity detection sensitivity in a case where the angles θ1 and θ2 are 45°. If the angles θ1 and θ2 are set to 45°, the detection sensitivity in the gravitational acceleration direction (z axis direction) is slightly reduced, for example, compared with a case where the angles are 44° or less; however, the detection ability is maintained at a high level when the roll angle is large. In particular, if the sensor unit 12 is disposed in a mobile unit such as a motorcycle, it is desired to maintain the detection ability when the roll angle is large, since the mobile unit makes a turn while being banked. In such a case, it is most appropriate to set 45° for the angles θ1 and θ2 formed by the axis for detecting the yaw angle of the mobile unit and the first and second angular velocity sensors 14 and 16. If the angles θ1 and θ2 are set to 45°, the roll angle and yaw angle are easily calculated. Thus, the calculation speed is increased and the moving state of the mobile unit is grasped quickly. If the angles θ1 and θ2 are set to 45°, the tolerances of the angles may be set to ±1°. Thus, if the first detection axis Z1 is tilted toward the second detection axis Z2 by 90°±2° in the sensor unit 12, the detection ability is secured when the roll angle is large.

In the sensor unit 12 as described above, the first angular velocity sensor 14 outputs an output signal V1 and the second angular velocity sensor 16 outputs an output signal V2. The V1 and V2 are voltage signals.

The sensor output correction circuit 20 is coupled to the back of the sensor unit 12, as shown in FIG. 1. The sensor output correction circuit 20 includes offset adjustment circuit 22 and 24 and sensitivity adjustment circuits 26 and 28. The adjustment circuits 22, 24, 26, and 28 are coupled to the backs of the first and second velocity sensors 14 and 16. The offset adjustment circuits (first and second offset adjustment circuits 22 and 24) are coupled to the backs of the angular velocity sensors 14 and 16, and makes offset adjustments to outputs of the angular velocity sensors 14 and 16. The first offset adjustment circuit 22 performs a calculation shown by Formula 2. Specifically, it makes an offset adjustment by adding an offset adjustment factor B1 to the output V1 of the first angular velocity sensor 14, and then outputs an adjustment result V1″.

$$V1''=V1+B1 \quad \text{Formula 2}$$

The second offset adjustment circuit 24 performs a calculation shown by Formula 3. Specifically, it makes an offset adjustment by adding an offset adjustment factor B2 to the output V2 of the second angular velocity sensor 16, and then outputs an adjustment result V2″.

$$V2''=V2+B2 \quad \text{Formula 3}$$

Figure 6A:
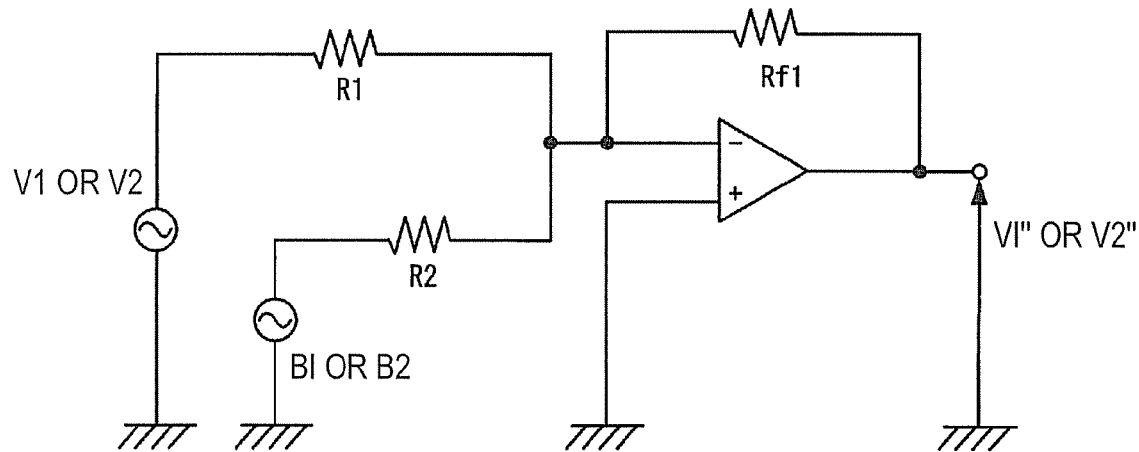
FIGS. 6A and 6B are specific examples of internal circuits included in an amplitude calculation circuit.

Therefore, the offset adjustment circuits 22 and 24 may be any type of circuits as long as the offset adjustment circuits are able to add offset adjustment factors to outputs of the angular velocity sensors 14 and 16 as described above. As a specific example, the offset adjustment circuits 22 and 24 may each be an addition circuit shown in FIG. 6A.

The sensitivity adjustment circuits (first and second sensitivity adjustment circuits 26 and 28) are coupled to the backs of the offset adjustment circuits 22 and 24, as shown in FIG. 1, and make sensitivity adjustments to outputs of the angular velocity sensors 14 and 16. The first sensitivity adjustment circuit 26 performs a calculation shown by Formula 4. Specifically, it multiplies an obtained value by subtracting a rest-time output voltage (reference voltage) Vref from the output V1″ of the first offset adjustment circuit 22 by a value obtained by dividing the sensitivity adjustment factor A1 by a scale factor (angular velocity sensitivity) S1 [mV/(deg./s)], and then outputs an adjustment result ω1′.

$$\omega 1' = \frac{(V1'' - Vref) \times A1}{S1} \quad \text{Formula 4}$$

The rest-time output voltage is values of output signals of the angular velocity sensor 14 and 16 at a time when no angular velocity is applied to the angular velocity sensors 14 and 16.

The second sensitivity adjustment circuit 28 performs a calculation shown by Formula 5. Specifically, it multiplies a value obtained by subtracting the rest-time output voltage Vref from the output V2″ of the second offset adjustment circuit 24, by a value obtained by dividing the sensitivity adjustment factor A2 by a scale factor S2, and then outputs an adjustment result ω2′.

$$\omega 2' = \frac{(V2'' - Vref) \times A2}{S2} \quad \text{Formula 5}$$

Figure 6B:
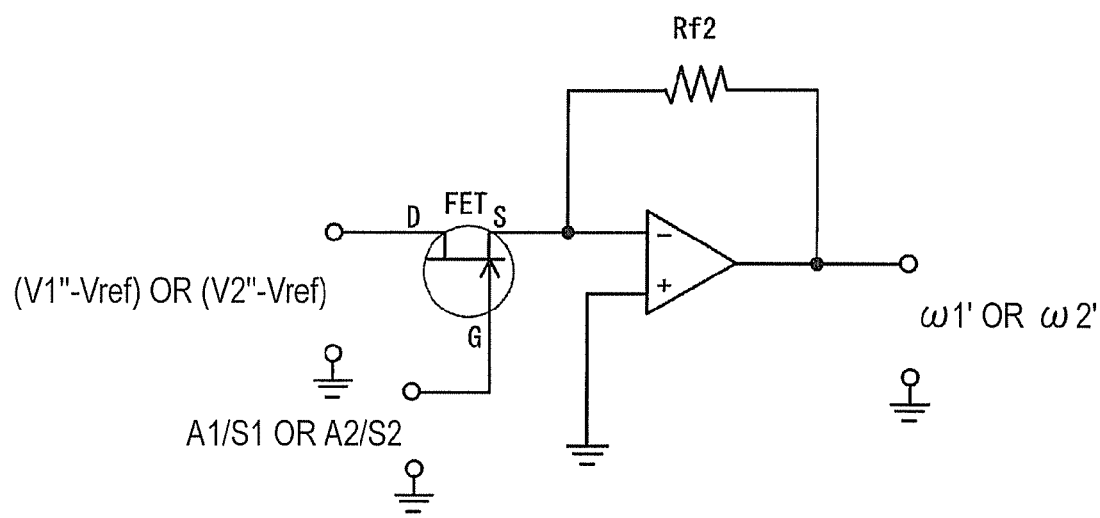

Therefore, the sensitivity adjustment circuits 26 and 28 may be any type of circuits as long as the sensitivity adjustment circuits are able to multiply the value obtained by subtracting the reference value from the offset adjustment result, by the value obtained by dividing the sensitivity adjustment factor by a scale factor, as described above. As a specific example, the sensitivity adjustment circuits 26 and 28 may each be a multiplication circuit shown in FIG. 6B.

The sensor output correction circuit 20 receives an output signal of the control circuit 50, as shown in FIG. 1. Specifically, the first offset adjustment circuit 22 receives the offset adjustment factor B1 from the control circuit 50 and the second offset adjustment circuit 24 receives the offset adjustment factor B2 from the control circuit 50. The first sensitivity adjustment circuit 26 receives the sensitivity adjustment factor A1 from the control circuit 50 and the second sensitivity adjustment circuit 28 receives the offset adjustment factor A2 from the control circuit 50. When the first and second offset adjustment circuits 22 and 24 and the first and second sensitivity adjustment circuits 26 and 28 receive a new adjustment factor from the control circuit 50, these circuits replace an adjustment factor stored in themselves with the new one and make an offset adjustment or a sensitivity adjustment using the new adjustment factor.

Coupled to the back of the sensor correction circuit 20 as described above are the sign determination circuit 30, amplitude calculation circuit 32, bank angular calculation circuit 40 and sensor failure check circuit 44. The sign determination circuit 30 is coupled to any one of the first and second sensitivity adjustment circuits 26 and 28. In FIG. 1, the sign determination circuit 30 is coupled to the first sensitivity adjustment circuits 26. In this case, the sign determination circuit 30 obtains the sign of the output ω1' of the first sensitivity adjustment circuits 26 and outputs the obtained sign, sign (ω1'), to the amplitude calculation circuit 32.

If a clockwise rotation is applied to the detection axes of the angular velocity sensors 14 and 16 when these axes are directed upward, the angular velocity sensors 14 and 16 detect CW. If a clockwise rotation is applied to these axes when these axes are directed downward, the angular velocity sensors 14 and 16 detect CCW. Therefore, if the first detection axis of the first angular velocity sensor 14 and second detection axis of the second angular velocity sensor 16 are orthogonal to each other, the combination of CW or CCW detected by the first angular velocity sensor 14 and CW or CCW detected by the second angular velocity sensor 16 is read. Thus, what angular velocity is applied from a detection axis extending in what direction is determined. Accordingly, if the sign determination circuit 30 is coupled to the first and second adjustment circuits 26 and 28, it determines what angular velocity is applied from a detection axis extending in what direction.

The amplitude calculation circuit 32 includes a square sum average circuit 34 and a multiplication circuit 36. The square sum average circuit 34 is coupled to the first and second sensitivity adjustment circuits 26 and 28 and receives the outputs ω1' and ω2' of the sensitivity adjustment circuits 26 and 28. The square sum average circuit 34 performs a calculation shown by Formula 6. Specifically, it sums up the square of the output ω1' of the first sensitivity adjustment circuit 26 and the square of the output ω2' of the second sensitivity adjustment circuit 28, and then calculates the square root of the summation result and outputs a calculation result |ω0'|.

$$|\omega 0'| = \sqrt{\omega 1'^2 + \omega 2'^2} \qquad \text{Formula 6}$$

Figure 7:
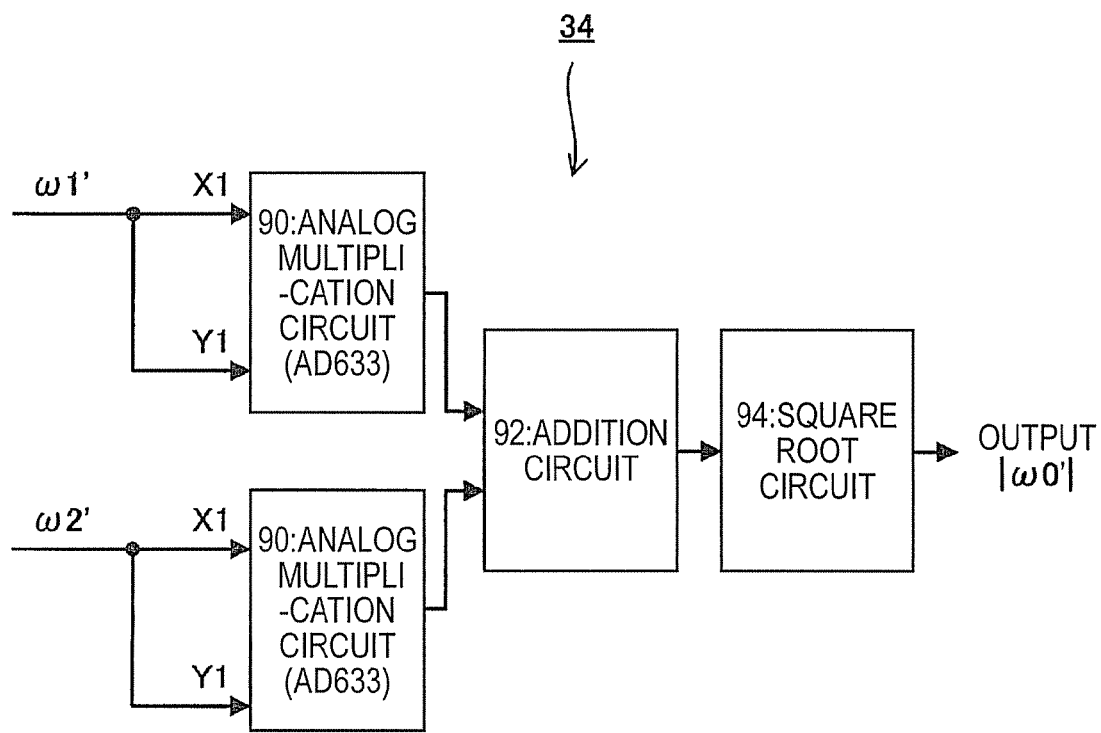
FIG. 7 is a diagram showing a specific example of a square sum average circuit.

The square sum average circuit 34 may be any type of circuit as long as it is able to perform the calculation shown by Formula 7. As a specific example, it may be a circuit shown in FIG. 7. The square sum average circuit 34 shown in FIG. 7 includes analog multiplication circuit 90 coupled to the backs of the first and second sensitivity adjustment circuits 26 and 28. The analog multiplication circuits 90 may be, for example, AD 633 multipliers. Before entering the analog multiplication circuits 90, outputs of the sensitivity adjustment circuits 26 and 28 are each branched into two outputs, X1 and Y1, which are in turn multiplied by each analog multiplication circuit 90. That is, the analog multiplication circuits 90 perform a calculation ω1'×ω1' and a calculation ω2'×ω2', respectively. Coupled to the backs of the analog multiplication circuits 90 is an addition circuit 92. The addition circuit 92 receives and adds the calculation results of the analog multiplication circuits 90. Coupled to the back of the addition circuit 92 is a square root circuit 94. The square root circuit 94 receives the calculation result of the addition circuit 92 and calculates the square root thereof. The calculated square root is an output |ω0'| of the square sum average circuit 34.

Coupled to the square sum average circuit 34 in the amplification circuit 32 is the multiplication circuit 36. The multiplication circuit 36 performs a calculation shown by Formula 7. Specifically, it receives and multiplies the output |ω0'| of the square sum average circuit 34 and the output, sign (ω1'), of the sign determination circuit 30 and then outputs a result ω0'.

$$|\omega 0'| = \text{sign}(\omega 1') \times |\omega 0'| \qquad \text{Formula 7}$$

The result ω0' of the multiplication circuit 36 is an output of the amplification calculation circuit 32. The output ω0' represents the angular velocity around an axis orthogonal to the mobile unit. By integrating this angular velocity, the yaw angle of the mobile unit is obtained.

The bank angle calculation circuit 40 is coupled to the back of the sensor output correction circuit 20. The bank angle calculation circuit 40 includes a phase calculation circuit 42, which is coupled to the backs of the first and second sensitivity adjustment circuits 26 and 28. The phase calculation circuit 42 performs a calculation shown by Formula 8. Specifically, it receives the output ω1' of the first sensitivity adjustment circuit 26 and the output ω2' of the second sensitivity adjustment circuit 28, and then calculates the arctangent of these outputs to obtain a bank θ.

$$\theta = \tan^{-1}\left(\frac{\omega 2'}{\omega 1'}\right) \qquad \text{Formula 8}$$

Figure 8:
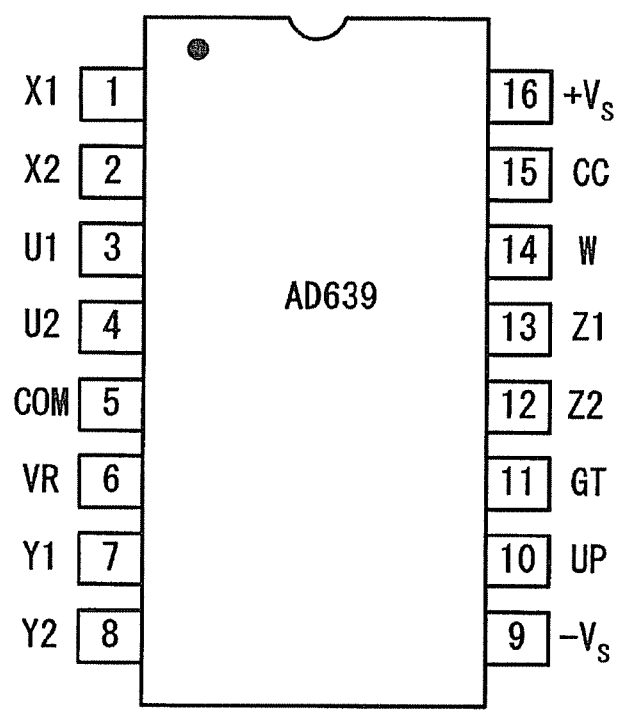
FIG. 8 is a diagram showing a specific example of a bank angle calculation circuit.
Figure 9:
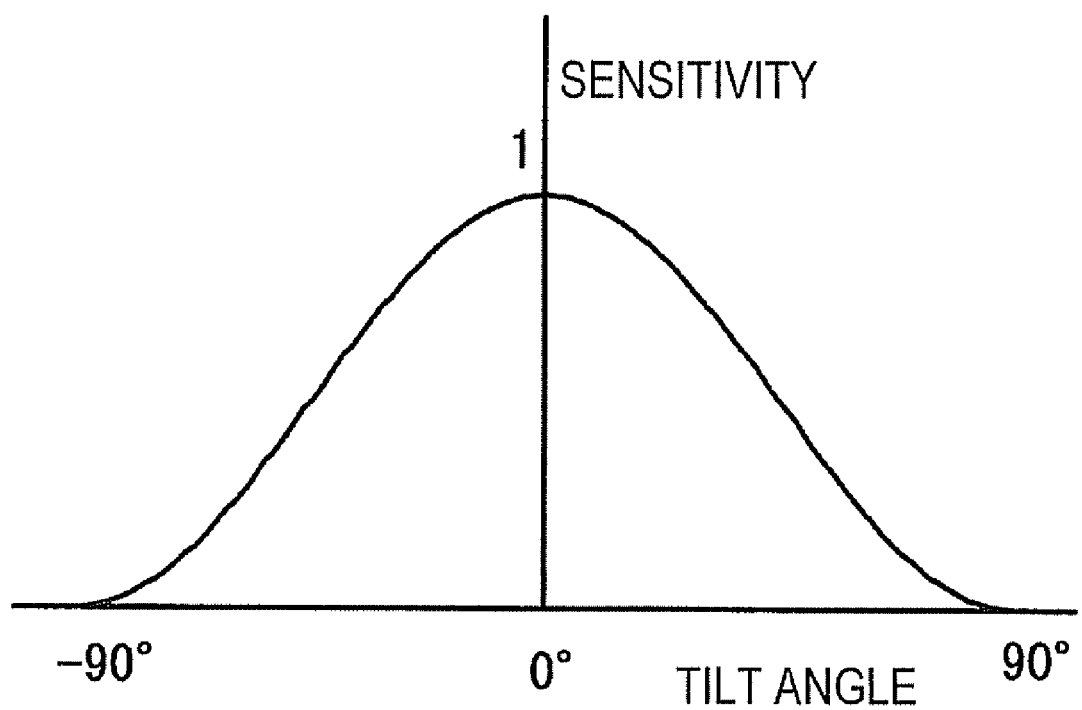
FIG. 9 is a graph showing the relation between sensitivity and a tilt angle θ of one gyro sensor.

The bank calculation circuit 40 for calculating the arctangent as described above may be an AD639 as shown as a specific example in FIG. 8.

Since the angular velocity detection circuit 10 is provided with the bank angular calculation circuit 40, the bank angle of the mobile unit is obtained when the mobile unit provided with the sensor unit 12 is banked.

The sensor failure check circuit 44 is coupled to the backs of the sensor output correction circuit 20 and bank angle calculation circuit 40. The sensor failure check circuit 44 receives the output ω1' of the first sensitivity adjustment circuit 26, the output ω2' of the second sensitivity adjustment circuit 28, the output θ of the phase calculation circuit 42, and a pulse (vehicle velocity pulse) obtained by measuring the velocity of the mobile unit provided with the sensor unit 12 using a vehicle velocity sensor. If the sensor failure check circuit 44 receives the outputs ω1' and ω2' of the sensor output correction circuit 20 even when it receives no vehicle velocity pulse (when the mobile unit is not moving) or if it receives the output θ of the phase calculation circuit 42 even when it receives no vehicle velocity pulse, it compares a predetermined threshold and the outputs ω1' and ω2' of the sensitivity adjustment circuits 26 and 28 or compares a predetermined threshold and the output θ of the phase calculation circuit 42. If any output is equal to or larger than the corresponding threshold, the sensor failure check circuit 44 determines that there is a failure in the sensor unit 12. This check result is outputted to the subsequent circuit.

The control circuit 50 as a component of the angular velocity detection apparatus 10 includes a mobile unit position determination circuit 52 and an adjustment factor calculation circuit 54. The mobile unit position determination circuit 52 receives an output of the multiplication circuit 36 included in the amplitude calculation circuit 32, an output of the phase calculation circuit 42 included in the bank angular calculation circuit 40, and an output of the sensor failure check circuit 44. The mobile unit position determination circuit 52 also receives the measurement results of multiple physical quantity sensors (vehicle velocity sensor, azimuth sensor, acceleration sensor, pressure sensor, gravity direction sensor, and temperature sensor) provided in the mobile unit.

The mobile unit position determination circuit 52 compares the output ω0' of the amplitude calculation circuit 32 and the measurement results of the physical quantity sensors and determines whether the ω0' and measurement results are matched. For example, the mobile unit position determination circuit 52 compares the position of the mobile unit obtained from the results received from the amplitude calculation circuit 32 and the bank angle calculation circuit 40 and the position of the mobile unit obtained from the measurement results of the multiple physical quantity sensors. If these positions are not matched, the mobile unit position determination circuit 52 determines that there is an error in the position of the mobile unit obtained from the calculation results of the amplitude calculation circuit 32 and bank angle calculation circuit 40, according to a comprehensive determination.

The adjustment factor calculation circuit 54 is coupled to the back of the mobile unit position determination circuit 52. If the mobile unit position determination circuit 52 determines that there is an error in the position of the mobile unit, the adjustment factor calculation circuit 54 calculates adjustment factors such that the position of the mobile unit obtained from the calculation results of the amplitude calculation circuit 32 and the bank angle calculation circuit 40 and the position of the mobile unit obtained from the measurement results of the multiple physical quantity sensors are matched. Then, the adjustment factor calculation circuit 54 outputs the calculation result to the sensor output correction circuit 20.

As described above, the angular velocity detection apparatus 10 makes an offset adjustment and a sensitivity adjustment to the output signals of the sensor unit 12 in the sensor output correction circuit 20. Therefore, the first and second angular velocity sensors 14 and 16 need not be sensors having an identical level of sensitivity. Also, the error is reduced. Thus, the angular velocity is detected with high accuracy.

Also, the double-T-shaped gyro sensor 60 has a higher level of sensitivity than that of a tuning-fork-shaped gyro sensor. Therefore, if the double-T-shaped gyro sensor 60 is used as the angular velocity sensors 14 and 16, the detection sensitivity of the sensor unit 12 is increased. Thus, even if the tilt angles of the first and second detection axes are set to a large angle, the detection ability of the angular velocity detection apparatus 10 is maintained. This allows the first detection axis to be orthogonal to the second detection axis. Thus, the detection range of the yaw rate is increased up to 180 and the angular velocity detection apparatus 10 obtains the axis of an angular velocity applied to the mobile unit. As a result, even when the bank angle of the mobile unit provided with at least the sensor unit 12 of the angular velocity detection apparatus 10 is increased, the yaw rate of the mobile unit is detected. Also, since the tilt angles of the first and second detection axes are set to a large angle, there is no longer the need for disposing the angular velocity sensors 14 and 16 in the mobile unit in a manner that these sensors are tilted by predetermined angles. Thus, the sensor unit 12 is easily disposed in the mobile unit, thereby suppressing the manufacturing cost of the angular velocity sensors 14 and 16. Also, since the angular velocity detection apparatus 10 is portable, it is easily mounted on the mobile unit.

As for the angular velocity detection apparatus 10, even when the sensor unit 12 is banked along with the mobile unit, the bank angle is obtained, since the axis of an angular velocity to be received is fixed. Thus, the angular velocity detection apparatus 10 including a bank angle detection apparatus is obtained. This allows the angular velocity detection apparatus 10 to accurately grasp the moving state of the mobile unit using the obtained bank angle θ. If the mobile unit is a motorcycle or the like, the moving state of the motorcycle is more accurately grasped.

The angular velocity detection apparatus 10 according to this embodiment obtains a yaw angle orthogonal to the mobile unit. Therefore, even when the mobile unit is moving on a slope, the angular velocity detection apparatus 10 obtains a yaw angle orthogonal to the mobile unit. On the other hand, a navigation system or the like obtains a yaw angle in a case where an image of a mobile unit is projected on a map. Specifically, a navigation system or the like obtains a yaw angle toward the zenith with respect to the actual mobile unit; therefore, it obtains a yaw angle toward the zenith even when the mobile unit is moving on a slope. That is, the angular velocity detection apparatus 10 according to this embodiment and a navigation system or the like have different detection axes as a reference.

The entire disclosure of Japanese Patent Application No. 2007-162527, filed Jun. 20, 2007 is expressly incorporated by reference herein.

What is claimed is:

1. An angular velocity detection apparatus, comprising:
a sensor unit having first and second detection axes serving as angular velocity detection axes, the first and second detection axes intersecting each other;
a sensor output correction circuit for making at least one of an offset adjustment and a sensitivity adjustment to a detection output of an angular velocity around the first detection axis and a detection output of an angular velocity around the second detection axis;
a sign determination circuit for obtaining a sign of a rotational direction of an angular velocity on any one of the first and second detection axes;
an amplitude calculation circuit for multiplying a square sum average of detection outputs of angular velocities around the first and second detection axes outputted by the sensor output correction circuit and a sign outputted by the sign determination circuit; and
a control circuit coupled to a back of the amplitude calculation circuit, wherein the control circuit receives and compares a multiplication result from the amplitude calculation circuit and output results from a plurality of physical quantity sensors other than the sensor unit, and if the multiplication result and the output results are not matched, the control circuit outputs an offset adjustment factor or a sensitivity adjustment factor for matching the multiplication result and the output results to the sensor output correction circuit.

2. The angular velocity detection apparatus according to claim 1, wherein
the sensor unit includes a first angular velocity sensor for detecting an angular velocity around the first detection axis and a second angular velocity sensor for detecting an angular velocity around the second detection axis, and
the first and second angular velocity sensors are disposed so that an angle θ1 formed by a gravitational acceleration direction and the first detection axis and an angle θ2 formed by a gravitational acceleration direction and the second detection axis have a relation of θ1=−θ2.

3. The angular velocity detection apparatus according to claim 2, wherein
the angular velocity sensors are double-T-shaped gyro sensors, and
the double-T-shaped gyro sensors each includes a base, detection arms extending from positions opposed to each other on the base, and drive arms disposed in parallel to the detection arms.

4. The angular velocity detection apparatus according to claim 1, wherein
an angle formed by the first and second detection axes is 90°±2°.

5. The angular velocity detection apparatus according to claim 1, further comprising
a bank angle calculation circuit for receiving a detection output ω1' of an angular velocity around the first detection axis and a detection output ω2' of an angular velocity around the second detection axis outputted by the sensor output correction circuit and obtaining a bank angle θ by performing a calculation of $$\theta = \tan^{-1}\left(\frac{\omega 2'}{\omega 1'}\right).$$

6. The angular velocity detection apparatus according to claim 5, further comprising
a sensor failure check circuit for receiving a detection output of an angular velocity around the first detection axis and a detection output of an angular velocity around the second detection axis outputted by the sensor output correction circuit, comparing a predetermined threshold and each of the detection outputs or comparing an output of an bank angle calculated by the bank angle calculation circuit and a predetermined threshold, and determining that there is a failure.

7. The angular velocity detection apparatus according to claim 1, wherein
the sensor unit is disposed in a mobile unit and the first and second detection axes are disposed so as to be orthogonal to a straight-ahead direction of the mobile unit.

* * * * *